United States Patent [19]

Kimura et al.

[11] Patent Number: 4,878,400
[45] Date of Patent: Nov. 7, 1989

[54] BIAS RATIO LEVELLING APPARATUS OF A WORM GEAR TYPE DIFFERENTIAL

[75] Inventors: Junzo Kimura, Nagoya; Toshiyuki Nakao, Chiryu, both of Japan

[73] Assignee: Aisin Seiki Kabushiki Kaisha, Kariya, Japan

[21] Appl. No.: 250,744

[22] Filed: Sep. 29, 1988

[30] Foreign Application Priority Data

Sep. 30, 1987 [JP] Japan .................... 62-246282

[51] Int. Cl.⁴ .................................. F16H 1/38
[52] U.S. Cl. ............................ 74/715; 74/710
[58] Field of Search ....................... 74/710, 715

[56] References Cited

U.S. PATENT DOCUMENTS

| | | | |
|---|---|---|---|
| 4,191,071 | 3/1980 | Gleasman et al. | 74/715 |
| 4,491,035 | 1/1985 | Gleasman et al. | 74/715 |
| 4,512,211 | 4/1985 | Stritzel | 74/715 |
| 4,751,853 | 6/1988 | Dissett | 74/715 |

FOREIGN PATENT DOCUMENTS 827730 2/1960 United Kingdom ........... 74/715

OTHER PUBLICATIONS

"A Tiny English Firm's Diff with a Difference is Stirring Up Interest", *Autoweek*, May, 1988, by Phil Berg, pg. 42.

*Primary Examiner*—Dwight G. Diehl
*Attorney, Agent, or Firm*—Burns, Doane, Swecker & Mathis

[57] ABSTRACT

A bias ratio levelling apparatus for a worm gear type differential include first and second shafts mounted on a common axis first and second worm gears fixedly provided in the rotational direction at opposed end portions of the two shafts, a first worm wheel directly intersected with the shafts and engaged with the first worm gear, a second worm wheel directly intersected with the shafts and engaged with the second worm gear, a rotatable member for rotatably bearing the first and second worm wheel about a central axis and for rotating first and second worm wheel about the first and second shafts. A spur gear is fixedly connected to each worm wheel for transmitting the rotation of one worm wheel to the other worm wheel by synchronization, and a spacer is interposed between the first and second worm gears and axially fixed to the rotational member in the direction of the first and second shafts.

6 Claims, 4 Drawing Sheets

BIAS RATIO LEVELLING APPARATUS OF A WORM GEAR TYPE DIFFERENTIAL

BACKGROUND OF THE INVENTION

1. Field of the Invention

The invention relates to a differential apparatus for vehicles and, more particularly, to a bias ratio levelling apparatus of both wheels for a worm gear type differential which is used for a differential limiting apparatus.

2. Description of the Prior Art

When one wheel falls into the mud, snow or similar type road conditions in a vehicle provided with a torsion-type differential, which is a type of differential limiting apparatus, there is a torque bias effect in which a transmitting torque is increased from a wheel of a high grip side to a low grip side by a frictional force and a gear thrust force of an inner gear of the differential. However, a distorted direction of a worm gear of a differential inside is the same at both wheels, so that the difference at a worm gear thrust force is generated upon the generation of the differential rotation. The thrust force influences greatly on a mechanism which generates a frictional resistance within a differential apparatus. Accordingly, the frictional resistance is generated at both wheels (left and right), this means a difference is also generated at a torque bias ratio. As a result, the driving stability of vehicle is damaged. U.S. Pat. No. 4,191,071 is an example of the abovementioned worm type differential, and is shown in FIGS. 8 and 9.

In 8, an axle shaft 16 is connected to a worm gear 6 through a spline connection and an axle shaft 17 is connected to a worm gear 10 through a spline connection. Worm wheel gears 7, 11 attached to a differential housing 14 via shafts 4, 5 are utilized for rotating worm gears 6, 10. Rotational force is transmitted to the differential housing 14 via the ring gear 15 and the rotation of the differential housing 14 is transmitted as a rotational force of worm wheels 7, 11 via shafts 4, 5. The worm wheel gear 7 rotates the worm gear 6 and the worm wheel gear 11 rotates the worm gear 10. When there is no difference in rotation of axle shafts 16, 17, the differential housing, worm gear, and worm wheel gear are integrally rotated, i.e., as a unit. Any rotational differences in the axle shafts are transmitted to the worm wheel upon turning and is synchronized with another worm wheel via spur gears 9, 13 attached to both sides of the shafts 4 and 5. Thus, when the rotation of the worm gear is decreased at one side and the speed is increased at the other, it is quickly differentiated.

However, when one wheel slips on an extremely low friction road surface, a double action of torque is generated by the frictional resistance of the teeth surface and the thrust force in the torsion-type differential and the torque is biased at a side of the differential which is gripping or is experiencing less slip. In FIG. 8, spacers 20, 19 are inserted in the worm gear side. However, this arrangement causes the worm gears to interfere with each other at opposite sides thereof.

In FIG. 9, a thrust needle bearing 24 is inserted at one side of the housing so that the thrust force between the worm gear 10 and the differential housing A is decreased and the bias at left and right outputs or wheels is equal, however, there is no equal or levelling effect if the thrust direction is a direction of the axle shaft 16 (in the upward direction in FIG. 9) As a result, a difference in thrust force is generated and the driving stability is damaged or otherwise adversely effected.

SUMMARY OF THE PRESENT INVENTION

It is a primary object of the present invention to obviate the above-described problems, by providing a bias ratio levelling apparatus for a worm gear type differential.

According to the present invention, a spacer is interposed between a first worm gear and a second worm gear and is fixedly connected to a rotational member in an axial direction of first and second shafts.

BRIEF DESCRIPTION OF THE DRAWINGS

These and other objects, features and advantages of the present invention will become more apparent on reading the following detailed description with reference to the accompanying drawings, wherein like members bear like reference numerals, and wherein.

DETAILED DESCRIPTION OF A PREFERRED EMBODIMENT

Figure 8:
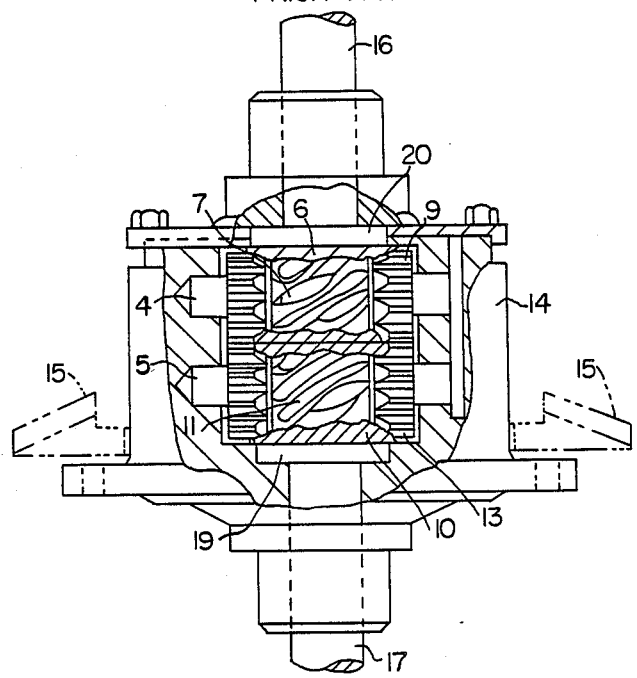
FIGS. 8 and 9 is a conventional worm type differential.
Figure 9:
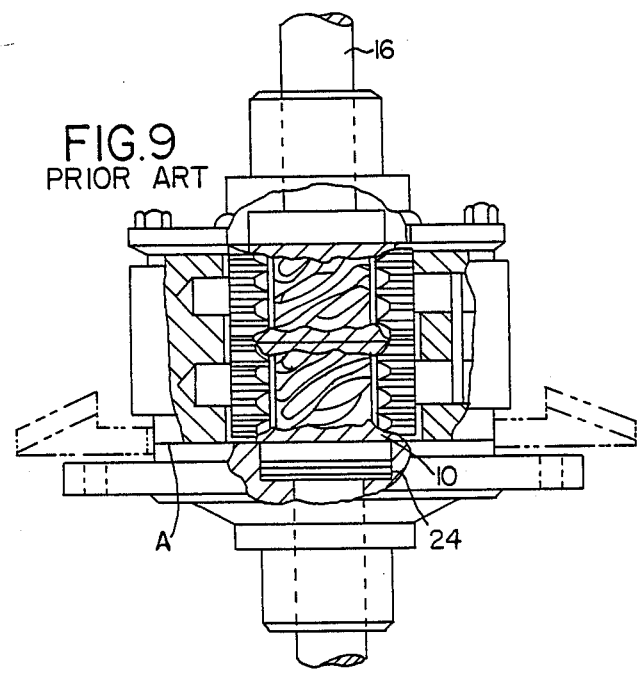

Those elements of the present invention which are described in FIGS. 8 and 9 are described by reference to the same numerals in the following explanation.

Figure 4:
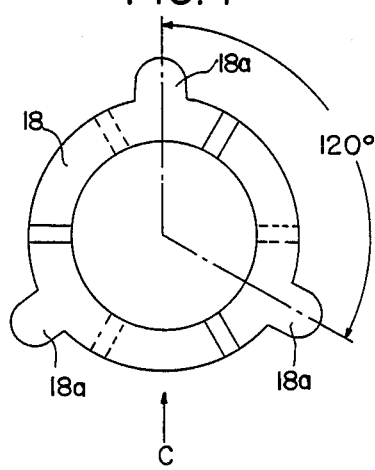
FIG. 4 an intermediate spacer.
Figure 5:
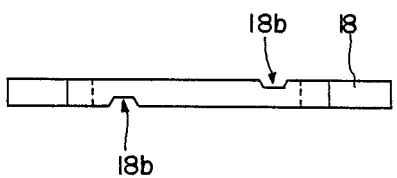
FIG. 5 a side view of FIG. 4, taken in the direction of the arrow C in FIG. 4.

As shown in FIGS. 4 and 5, an intermediate spacer 18 is of substantially ring-shaped plate material and is provided with three radially projecting nail or protrusion sections 18a for engaging the differential casing and blocking thrust forces. The sections are spaced at equal intervals of 120° angle in the circumferential direction thereof. Three radial oil grooves 18b are provided on front and rear surfaces of the spacer 18 and are circumferentially spaced from the protrusion sections 18a.

Figure 1:
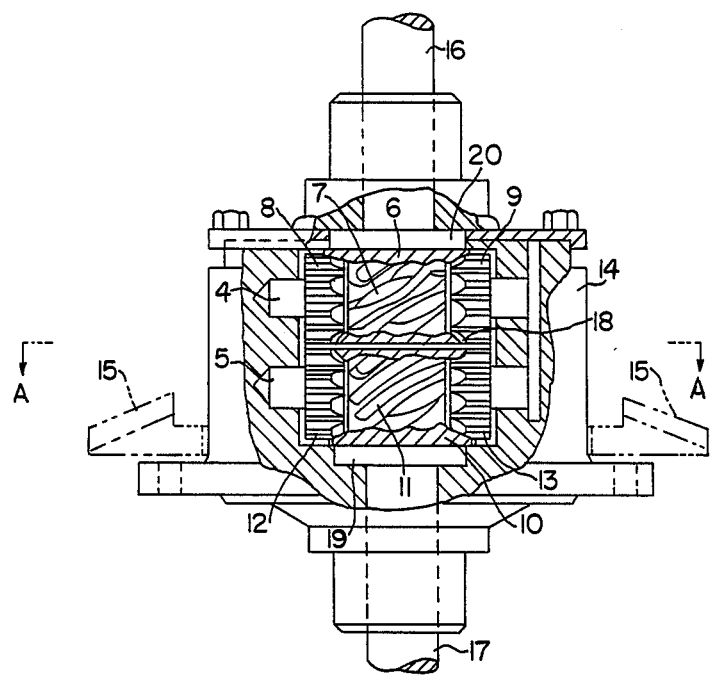
FIG. 1 is a partial sectional view of a worm type differential according to the present invention.
Figure 2:
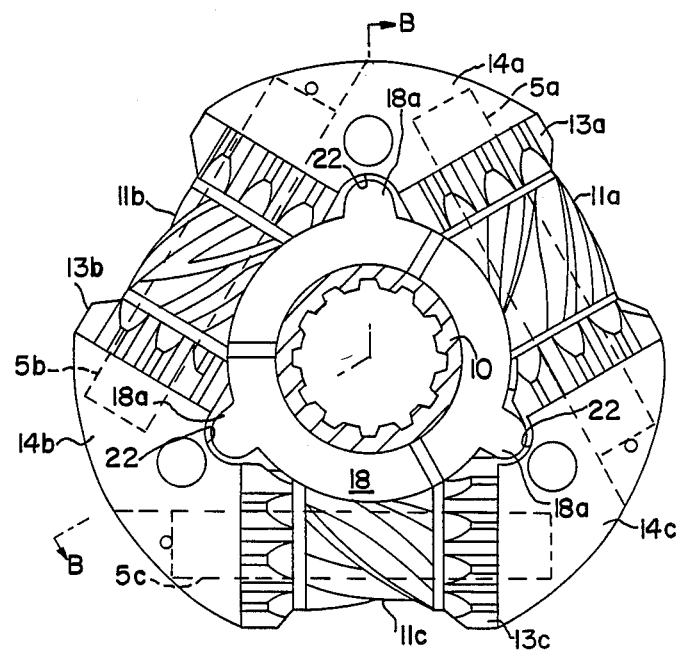
FIG. 2 is a sectional view taken along the line A—A in FIG. 1.
Figure 3:
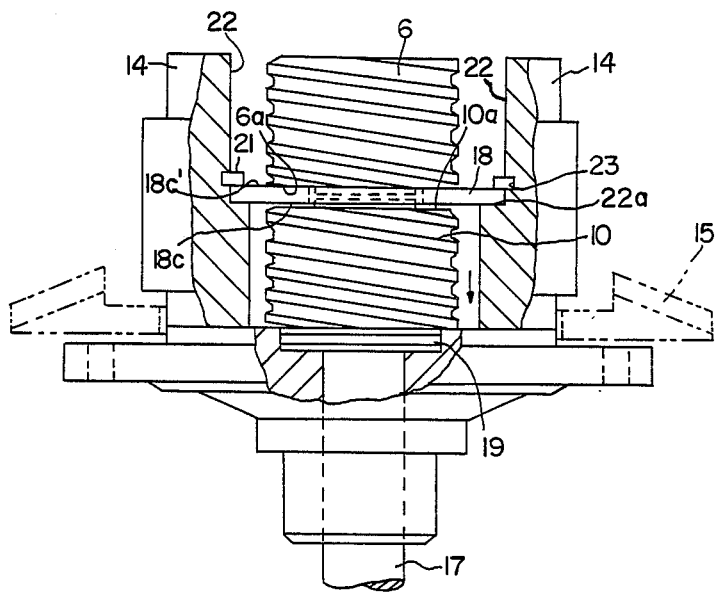
FIG. 3 is a sectional view of FIG. 2 taken along the line B—B in FIG. 2.

The intermediate spacer 18 is positioned between the worm gear 6 and the worm gear 10 (FIG. 3). As shown in FIG. 2, the protrusion sections 18a of the spacer 18 are engageable with differential body cases 14a, 14b and 14c. Grooves 22 are provided with a configuration which receives an outer circumference of a protrusion section 18a. A clearance is provided between an end surface 10a of the axial worm gear 10 and a spacer surface 18c opposed thereto and a similar clearance is provided between an end surface 6a of the worm gear 6 and a spacer surface 18c', opposite surface 18c.

The spacer 18 is inserted in the casing by engaging protrusion sections 18a in the grooves 22. A section of the spacer surface 18c is in contact with a step portion 22a of the groove 22. A snap ring 21 is fixed within a groove provided on differential body cases 14a, 14b, 14c and blocks movement of the spacer 18 into the axle shaft 16. The spacer is circumferentially fixedly secured in position by the sections 18a and is axially fixedly secured by the stepped portion 22a and the snap ring 21. The spacer 18 is integrally rotatable with the differential body case 14 due to the connections with the protrusions 18a.

The operation according to the present invention is as follows. The intermediate spacer 18 is fixedly connected to the differential body case 14 and is integrally rotatable therewith. Thrust forces of worm gears 6, 10 generated upon differential rotation acts on or is transferred to the spacer 18 and, due to its connection with the casing, is transferred to the differential case 14. Thrust forces, generated by the worm gears, do not interfere with each other and are transmitted to the spacer 18. Therefore, the difference of bias ratio at left and right driven wheels is reduced in comparision to conventional differentials.

Figure 6:
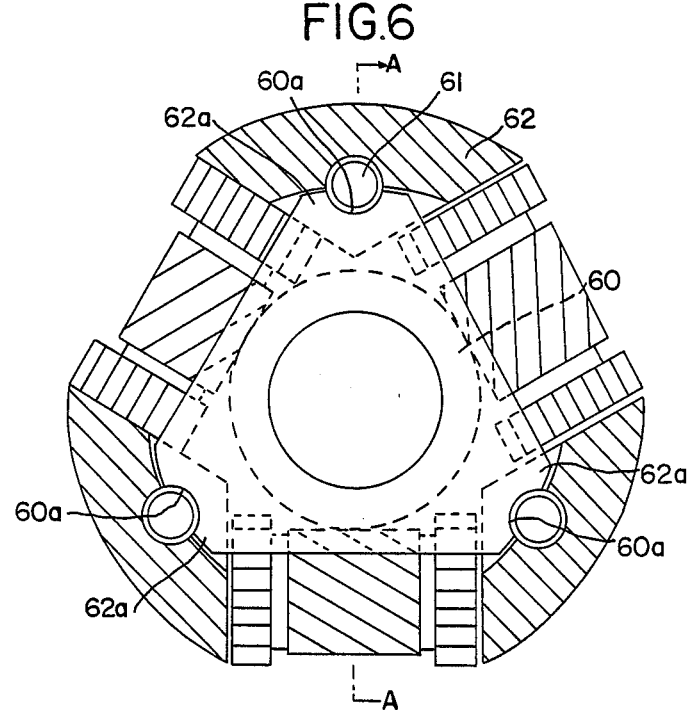
FIG. 6 is a similar view to FIG. 2 showing an another embodiment according to the present invention.
Figure 7:
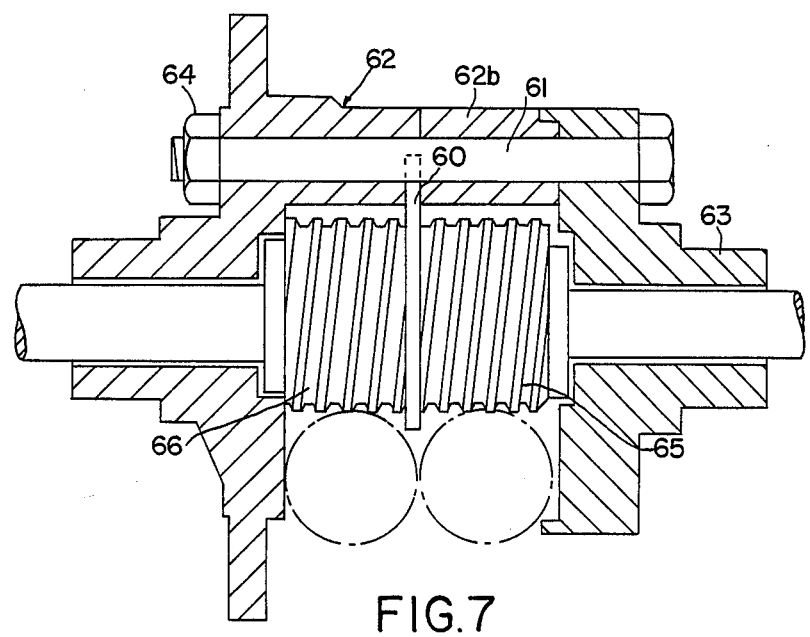
FIG. 7 is a similar view to FIG. 2, however, taken along the line A—A in FIG. 6.

FIGS. 6 and 7 show another embodiment of the invention. Therein, an intermediate spacer 60 has a substantially triangular shape and a groove 60a is formed at each apex thereof. A bolt 61 integrally connects a differential case 62 and a differential case cover 63 by being received therethrough and held in place by a nut 64. A groove 60a is provided in the spacer 60 and is engageable with an outer circumference of the bolt 61. Each apex of the spacer 60 is in contact with the differential case 62. The case has a stepped portion 62a provided for fixedly securing the axial position of the spacer. The depth of the stepped portion 62a is formed so as to be substantially equal to the plate thickness of the spacer 60. The spacer 60 is axially inserted in the casing by engaging the groove 60a with the bolt 61 and is circumferentially fixed thereby. One end surface of the spacer is in contact with the stepped portion 62a and other end surface thereof is in contact with an intermediate member 62b of the differential case 62 for fixing the axial position and is interposed between the spacer 60 and case cover 63. The spacer 60 is integrally rotatable with the differential case 62 via the groove 60a.

In the differential limiting apparatus according to the present invention, the interference of the thrust force of each worm gear is prevented by the spacer located between the worm gears. As a result, the levelling of the bias ratio of the left and right wheels can be attained and the driving stability of vehicles is enhanced.

Further, the spacer is fixedly connected via the engaging portion provided on the differential case, so that the spacer cannot drop out of position due to wear. Additionally, wear of the spacer is substantially reduced as the spacer does not slide in the assembly. In the conventional construction in which a needle bearing is located between a worm gear of one side and a differential housing only one direction of the rotational force is transmitted to the differential housing and the levelling of the bias ratio is not equal for both directions of rotation. Further, the cost for the use of a bearing arrangement in the conventional differential is greater than the spacer arrangement of the present invention.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A bias ratio levelling apparatus for a worm gear type differential comprising:
   first and second shafts mounted on a common axis in series,
   first and second worm gears fixedly connected to opposed end portion of said two shafts,
   a first worm wheel directly engaged with said first worm gear,
   a second worm wheel directly engaged with said second worm gear,
   a rotational member for rotatably supporting said first and second worm wheels about a central axis of each worm wheel and for rotating said first and second worm wheels about said first and second shafts,
   a spur gear fixedly connected to each said worm wheel and for transmitting rotation of said one worm wheel to said other worm wheel, and
   a spacer interposed between said first and second worm gears and axially fixed to said rotational member in the axial direction of first and second shafts in such a manner that thrust force generated at one end of the one of said first and second worm gears does not interfere with the other of said worm gears.

2. A bias ratio levelling apparatus for a worm gear type differential as set forth in claim 1, further comprising radial protrusions provided on said spacer.

3. A bias ratio levelling apparatus for a worm gear type differential as set forth in claim 2, wherein said radial protrusions of said spacer are engaged with said rotational member in a region which avoids interference with said spur gear.

4. A bias ratio levelling apparatus for a worm gear type differential as set forth in claim 1, wherein said spacer is provided with apex portions in engagement with said rotational member and secured thereto by fastening means.

5. A bias ratio levelling apparatus for a worm gear type differential comprising:
   first and second shafts mounted on a common axis in series,
   first and second worm gears fixedly connected to opposed end portion of said two shafts,
   a first worm wheel directly engaged with said first worm gear,
   a second worm wheel directly engaged with said second worm gear,
   a rotational member for rotatably supporting said first and second worm wheels about a central axis of each worm wheel and for rotating said first and second worm wheels about said first and second shafts,
   a spur gear fixedly connected to each said worm wheel and for transmitting rotation of said one worm wheel to said other worm wheel, and
   a spacer interposed between said first and second worm gears and axially fixed to said rotational member in the axial direction of first and second shafts wherein said spacer is provided with apex portions in engagement with said rotational member and secured thereto by fastening means, and wherein said rotational member includes two casing sections with an intermediate member therebetween, said spacer engaging one of said casing sections and said intermediate member, and said fastening means interconnects said two casing sections, said intermediate member and said spacer.

6. A bias ratio levelling apparatus for a worm gear type differential comprising:
   first and second shafts mounted on a common axis in series,
   first and second worm gears fixedly connected to opposed end portion of said two shafts,
   a first worm wheel directly engaged with said first worm gear,
   a second worm wheel directly engaged with said second worm gear,
   a rotational member for rotatably supporting said first and second worm wheels about a central axis of each worm wheel and for rotating said first and second worm wheels about said first and second shafts,
   a spur gear fixedly connected to each said worm wheel and for transmitting rotation of said one worm wheel to said other worm wheel, and
   a spacer interposed between said first and second worm gears and axially fixed to said rotational member in the axial direction of first and second shafts wherein said spacer is positioned on a step portion of said rotational member and is fixed thereby by a snap ring.

* * * * *